Patented July 6, 1926.

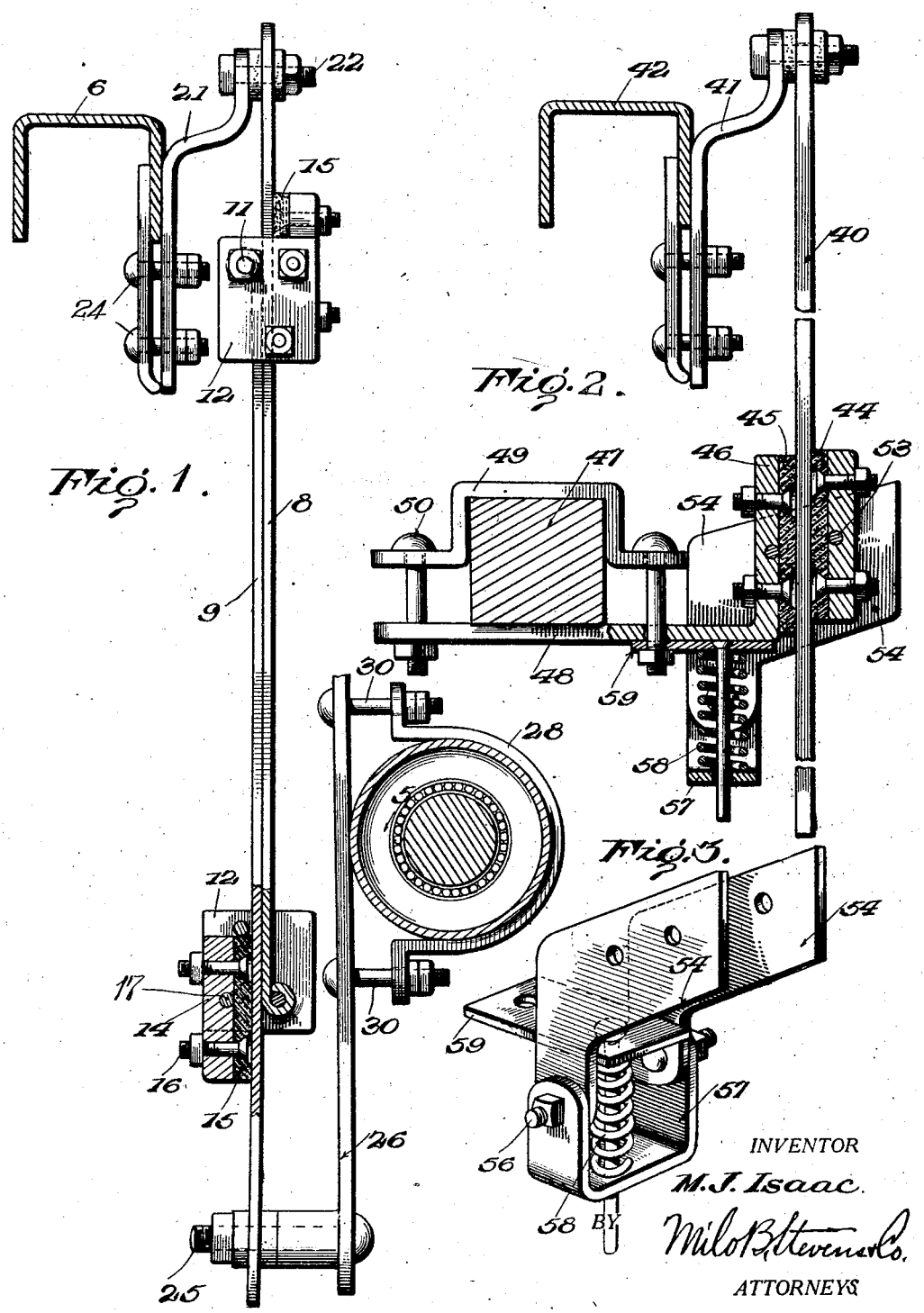

1,591,386

UNITED STATES PATENT OFFICE.

MATTHEW J. ISAAC, OF FORT BLISS, TEXAS.

SHOCK ABSORBER.

Application filed March 12, 1924. Serial No. 698,735.

This invention relates to shock absorbers especially adapted for application to automobiles.

Briefly stated, an important object of this invention is to provide a shock absorber which may be conveniently applied to a motor vehicle of standard construction without altering the construction of the automobile and without in any way interfering with the operation or control of the same.

A further object of the invention is to provide a shock absorber having reliable means to check the rebound of the vehicle, which rebound renders riding over rough roads more or less unpleasant, especially when riding in a light vehicle.

A further object of the invention is to provide a shock absorber of the character specified which is of highly simplified construction, durable in use and is cheap to manufacture.

Other objects and advantages will be apparent during the course of the following description.

In the accompanying drawing forming a part of this application and in which like numerals are employed to designate like parts throughout the same, Figure 1 is a side elevation of the shock absorber.

Figure 2 is a fragmentary side elevation of a slight modification of the invention, parts being shown in section.

Figure 3 is a perspective of a portion of the shock absorber illustrated in Figure 2.

In the drawing, the numeral 5 designates the relatively movable portion of an automobile such as the front axle or the differential housing and the numeral 6 designates the relatively fixed portion of an automobile such as the frame of the chassis.

The main leaves or plates 8 and 9 of the shock absorber are arranged in overlapping relation and are provided at their inner ends with transversely extending sleeves or rolled portions 10 for the reception of an attaching pins 11 which as plainly illustrated in Figure 1 extend through the side plates 12 of the friction member 14. Each friction member 14 might be said to be in the form of a substantially U-shaped member, the bight portion of which is provided with friction strip 15 held in place by fastening devices 16 and being similar in formation to ordinary brake lining. Fig. 1 plainly illustrates that the friction lining 15 flatly contacts with the adjacent leaf and as the overlapping leaves 8 and 9 are moved away from each other due to the rebounding of the vehicle the friction linings 15 are pressed more tightly in engagement with the adjacent leaf for retarding the movement of the movable body 5 away from the relatively fixed portion of the automobile.

The side plates 12 are not rigidly connected to the friction members 14, but are pivotally connected thereto by means of what might be said to be fulcrum pins 17.

During the rebounding of the vehicle the leaves 8 and 9 are moved to extended position and when this occurs each pin 11 moves away from the adjacent pin 17 and this of course forces the friction lining 15 more firmly into engagement with the adjacent leaf so as to retard this separation of the leaves. However this arrangement does not in any way retard the movement of the bodies 5 and 6 toward each other as during this movement each pin 11 is moved toward the horizontal plane of the adjacent pivoted pin 17 this of course is not accompanied by any increased friction between the friction linings 15 and the associated leaves.

As illustrated in Figure 1 the upper portion of leaf 8 is secured to an attaching bracket or strap 21 as indicated at 22 and the bracket 21 is in turn secured to a fixed portion of the vehicle by means of a clip 23 and attaching bolts 24.

The lower end of the leaf 9 is provided with a laterally extending bolt 25 which in turn is connected to a bracket 26. The bracket 26 is provided with clamp 28 which may be secured about the portion 5 of the vehicle by means of fastening bolts 30.

In the modification of the invention illustrated in Figs. 2 and 3 the single leaf 40 is secured at its upper end to a bracket 41 which is in turn secured to a relatively fixed portion 42 of the vehicle.

The lower portion of the leaf 40 is movable between friction elements 44 and 45, the friction element 45 being carried by a supporting bracket 46 rigidly secured to the axle 47 or other movable portion of the vehicle by means of clamps 48 and 49, the said clamps being connected and held in place by means of fastening devices 50.

Fig. 2 illustrates that the friction member 44 is connected as indicated at 53 to the sides 54, which are in turn pivoted as indicated at 56 to a U-shaped attaching member 57.

Fig. 3 illustrates that a coil spring 58 is confined between a plate 59 and the bight portion of the U-shaped member 57 and the spring 58 urges the friction element 44 into braking contact with the leaf 40 whereby the separation of the bodies 42 and 47 is retarded. However this arrangement does not in any way interfere with the movement of the bodies 42 and 47 toward each other.

With reference to the foregoing description taken in connection with the accompanying drawing it will be seen that shock absorber constructed in acordance with this invention may be quickly and conveniently applied to a standard automobile without in any way marring the appearance of the same or interfering with its operation.

The shock absorber will effectively check the rebound and consequently any inequalities encountered in the roadway will not result in discomfort to occupants of the vehicle.

The foregoing illustrates that the invention forming the subject matter of this application is capable of a wide variety of mechanical expressions and therefore it is to be understood that the forms of the invention herewith shown and described are to be taken merely as preferred examples of the same and such minor changes and arrangements and construction of parts may be made as will remain within the spirit of the invention and the scope of what is claimed.

Having thus described the invention, what is claimed is:

1. A shock absorber comprising a bracket having attaching means and provided with an upstanding branch having a friction member, a pair of spaced parallel substantially L-shaped plates at opposite sides of said branch and pivotally connected thereto, a friction member pivoted to said plates and a leaf confined between said first and second named friction members, and a spring between said plates and urging said second named friction member into braking engagement with said leaf.

2. A shock absorber comprising a bracket having attaching means and a friction block, a pair of spaced plates at opposite sides of said block and pivotally connected thereto, a friction block opposite said first-named block and connected to and positioned between said plates, a U-shaped member having sides pivoted to the lower terminal portions of said plates, and a spring positioned between and protected by the sides of said U-shaped member and the lower portions of said plates and exerting a tension on said U-shaped member to urge the second-named friction block into braking engagement with a leaf.

3. A shock absorber comprising a bracket having a friction block securely connected thereto, a pair of spaced parallel plates arranged at opposite sides of said friction block and pivotally connected thereto, a friction block pivotally connected to said spaced parallel plates, a leaf positioned between said friction blocks, a U-shaped member pivoted to the lower portions of said spaced parallel plates, a coil spring positioned between the sides of said U-shaped member and the lower portions of said spaced parallel plates and protected thereby, said spring being adapted to exert a tension on said U-shaped member to urge the second-named friction block into braking engagement with said leaf.

4. A shock absorber comprising a friction block, a pair of plates pivoted to opposite sides of said block, a friction block pivoted between said plates, a leaf positioned between said blocks, a U-shaped member pivoted to said plates, a coil spring positioned between and protected by the sides of said U-shaped member and said plates, and a pin extending centrally through said spring.

In testimony whereof I affix my signature.

MATTHEW J. ISAAC.